United States Patent
Hartinger et al.

(10) Patent No.: US 11,188,449 B2
(45) Date of Patent: Nov. 30, 2021

(54) AUTOMATED EXCEPTION RESOLUTION DURING A SOFTWARE DEVELOPMENT SESSION BASED ON PREVIOUS EXCEPTION ENCOUNTERS

(71) Applicant: Red Hat, Inc., Raleigh, NC (US)

(72) Inventors: Jozef Hartinger, Prague (CZ); Lincoln Baxter, III, Charlotte, NC (US); Joshua R. Kinlaw, Garner, NC (US); Ian P. Hands, Asheville, NC (US)

(73) Assignee: Red Hat, Inc., Raleigh, NC (US)

( * ) Notice: Subject to any disclaimer, the term of this patent is extended or adjusted under 35 U.S.C. 154(b) by 914 days.

(21) Appl. No.: 15/168,617

(22) Filed: May 31, 2016

(65) Prior Publication Data

US 2017/0344461 A1    Nov. 30, 2017

(51) Int. Cl.
G06F 11/36        (2006.01)

(52) U.S. Cl.
CPC ...... *G06F 11/3664* (2013.01); *G06F 11/3612* (2013.01)

(58) Field of Classification Search
CPC ............. G06F 11/3664; G06F 11/3612; G06F 11/0772; G06F 9/3861; G06F 2209/481; G06F 3/121
USPC ........................................................ 717/125
See application file for complete search history.

(56) References Cited

U.S. PATENT DOCUMENTS

| | | | |
|---|---|---|---|
| 5,845,125 A * | 12/1998 | Nishimura | G06F 11/3664 717/129 |
| 6,339,832 B1 | 1/2002 | Bowman-Amuah | |
| 6,434,628 B1 | 8/2002 | Bowman-Amuah | |
| 7,343,529 B1 | 3/2008 | Klinkner et al. | |
| 7,865,887 B2 * | 1/2011 | Kaiser | G06F 9/542 717/161 |
| 7,895,470 B2 | 2/2011 | Nastacio et al. | |
| 7,984,220 B2 * | 7/2011 | Gerard | G06F 11/0715 710/302 |
| 8,028,203 B2 | 9/2011 | Chellam et al. | |
| 8,112,677 B2 * | 2/2012 | Barlow | G06F 11/364 714/46 |
| 8,386,960 B1 * | 2/2013 | Eismann | G06F 9/451 715/835 |

(Continued)

FOREIGN PATENT DOCUMENTS

WO    2017134677 A1    8/2017

OTHER PUBLICATIONS

Filho et al., "ConExT-U: A Context-aware Exception Handling Mechanism for Task-Based Ubiquitous Systems", 2014, IEEE (Year: 2014).*

(Continued)

*Primary Examiner* — Wei Y Zhen
*Assistant Examiner* — Junchun Wu
(74) *Attorney, Agent, or Firm* — Withrow & Terranova, PLLC

(57) ABSTRACT

Automated exception resolution during a software development session based on previous exception encounters is disclosed. A first software development session of a user is monitored. A first exception during the first software development session is detected. In response to detecting the first exception, first contextual information is obtained from the computing device. The first contextual information and first exception information that identifies the first exception is stored in a storage device.

17 Claims, 8 Drawing Sheets

(56) References Cited

U.S. PATENT DOCUMENTS

| | | | |
|---|---|---|---|
| 8,407,724 B2 | 3/2013 | Niazi | |
| 8,479,160 B2* | 7/2013 | Lawton | G06F 12/0875 |
| | | | 717/120 |
| 8,881,113 B2 | 11/2014 | Zheng et al. | |
| 9,110,803 B2 | 8/2015 | Archer et al. | |
| 9,740,593 B2 | 8/2017 | Boxall et al. | |
| 2001/0025373 A1* | 9/2001 | Gebhart | G06F 9/45508 |
| | | | 717/146 |
| 2002/0184613 A1* | 12/2002 | Kuzemchak | G06F 11/28 |
| | | | 717/126 |
| 2003/0171947 A1* | 9/2003 | Ledford | G06Q 10/10 |
| | | | 717/102 |
| 2006/0070037 A1 | 3/2006 | Canning et al. | |
| 2006/0294158 A1* | 12/2006 | Tsyganskiy | G06F 8/72 |
| 2007/0011689 A1* | 1/2007 | Hiraoka | G06F 11/3612 |
| | | | 719/318 |
| 2007/0164849 A1 | 7/2007 | Haeberle et al. | |
| 2007/0174731 A1 | 7/2007 | Haeberle et al. | |
| 2007/0234270 A1 | 10/2007 | Cohen et al. | |
| 2007/0294672 A1* | 12/2007 | Mosuoka | G06Q 10/06 |
| | | | 717/126 |
| 2008/0034351 A1 | 2/2008 | Pugh et al. | |
| 2009/0013208 A1 | 1/2009 | DiMuzio | |
| 2009/0106729 A1* | 4/2009 | Adi | G06Q 10/06 |
| | | | 717/101 |
| 2009/0327809 A1 | 12/2009 | Joy et al. | |
| 2010/0077385 A1 | 3/2010 | Flores Assad et al. | |
| 2010/0146489 A1* | 6/2010 | Ortiz | G06F 11/3688 |
| | | | 717/128 |
| 2010/0211932 A1 | 8/2010 | Jones et al. | |
| 2011/0154300 A1* | 6/2011 | Rao | G06F 11/3624 |
| | | | 717/133 |
| 2011/0258605 A1* | 10/2011 | Ioannou | G06F 8/77 |
| | | | 717/126 |
| 2013/0263102 A1* | 10/2013 | Ergan | G06F 8/443 |
| | | | 717/158 |
| 2013/0311973 A1* | 11/2013 | Rice | G06F 11/3664 |
| | | | 717/124 |
| 2013/0332907 A1* | 12/2013 | Warren | G06F 9/448 |
| | | | 717/125 |
| 2014/0149967 A1* | 5/2014 | Deshpande | G06F 11/3664 |
| | | | 717/124 |
| 2014/0325486 A1* | 10/2014 | Zhang | G06F 11/3664 |
| | | | 717/125 |
| 2015/0052503 A1* | 2/2015 | Ligman | G06F 11/3664 |
| | | | 717/125 |
| 2015/0082277 A1 | 3/2015 | Champlin-Scharff et al. | |
| 2015/0095892 A1* | 4/2015 | Baggott | G06F 11/34 |
| | | | 717/127 |
| 2015/0193329 A1* | 7/2015 | Strode | G06F 11/0769 |
| | | | 717/125 |
| 2016/0014059 A1 | 1/2016 | Rathod | |
| 2016/0078439 A1 | 3/2016 | Vanska et al. | |
| 2016/0274997 A1* | 9/2016 | Kachko | G06F 11/3636 |
| 2016/0299807 A1 | 10/2016 | Tanabe et al. | |
| 2016/0330156 A1 | 11/2016 | Dunne et al. | |
| 2017/0344461 A1* | 11/2017 | Hartinger | G06F 11/3664 |

OTHER PUBLICATIONS

Wendt et al., "an Open Development Contextual Sensing Framework Enabling Reactive Applications", 2016, IEEE/ACM (Year: 2016).*

Zhou et al., "Context-aware pervasive service composition and its implementation", Aug. 2010, Springer-Verlag (Year: 2010).*

Rocha et al., "Towards a Formal Model to Reason about Context-Aware Exception Handling", 2012, IEEE (Year: 2012).*

Ahmed, Mostafa M. et al., "Predicting Bug Category Based on Analysis of Software Repositories," 2nd International Conference on Research in Science, Engineering and Technology (ICRSET'2014), Mar. 21-22, 2014, Dubai (UAE), pp. 44-53.

Morris, Simon, "7 Benefits of Using a Known Error Database (KEDB)," The ITSM Review, Apr. 16, 2012, 13 pages, http://www.theitsmreview.com/2012/04/7-benefits-of-using-a-kedb/.

Non-Final Office Action for U.S. Appl. No. 15/168,587, dated Oct. 6, 2017, 18 pages.

Monson, Philip, et al., "IBM Workplace for Business Strategy Execution," Red Paper, First Edition, Jun. 2006, International Business Machines Corporation, 224 pages.

Wei, R., et al., "Exception Resolution Service for RBAC systems," International Conference on Computer Supported Cooperative Work in Design, 2007, IEEE, 6 pages.

Xu, Jie, et al., "Concurrent Exception Handling and Resolution in Distributed Object Systems," IEEE Transactions on Parallel and Distributed Systems, Oct. 2000, vol. 11, Issue 10, IEEE, pp. 1019-1032.

Notice of Allowance for U.S. Appl. No. 15/168,587, dated Jun. 15, 2018, 10 pages.

* cited by examiner

US 11,188,449 B2

AUTOMATED EXCEPTION RESOLUTION DURING A SOFTWARE DEVELOPMENT SESSION BASED ON PREVIOUS EXCEPTION ENCOUNTERS

TECHNICAL FIELD

The examples relate generally to software development and, in particular, to exception resolution in a software development session.

BACKGROUND

Software development can be a complex, time-consuming, and expensive process. Complex software modules may have thousands, hundreds of thousands, or even millions of lines of instructions. Exception messages are sometimes issued by compilers or during runtime of the corresponding executable to identify problems in the software.

SUMMARY

The examples keep track of a user's encounters with exceptions over time. The examples automatically recognize that the user has encountered the same exception previously and present contextual information regarding previous encounters with the same exception to aid the user in rapidly resolving an exception. In one example a method is provided. The method includes monitoring, by a computing device comprising a processor device, a first software development session of a user. The method further includes detecting a first exception during the first software development session. The method further includes, in response to detecting the first exception, obtaining first contextual information from the computing device, and storing the first contextual information and first exception information that identifies the first exception in a storage device.

In another example a computing device is provided. The computing device includes a memory and a processor device coupled to the memory. The processor device monitors a first software development session of a user and detects a first exception during the first software development session. The processor device in response to detecting the first exception, obtains first contextual information from the computing device. The processor device stores the first contextual information and first exception information that identifies the first exception in a storage device.

In another example a computer program product is provided. The computer program product is stored on a non-transitory computer-readable storage medium and includes instructions to cause a processor device to carry out steps of monitoring a first software development session of a user and detecting a first exception during the first software development session. The steps further include, in response to detecting the first exception, obtaining first contextual information from a computing device, and storing the first contextual information and first exception information that identifies the first exception in a storage device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Software development is a complex process typically performed by relatively highly compensated individuals. Software development is typically an iterative process that involves multiple stages. One stage involves writing the necessary software instructions. Complex software modules may have thousands, hundreds of thousands, or even millions of lines of instructions. Software compilers and interpreters require every instruction to conform to a particular syntax, and to be internally consistent. A single typographical error in one line of instructions can lead to an exception being reported somewhere else in the lines of instructions. Often exception messages issued by compilers or interpreters are not helpful in identifying what caused the exception. This may be similarly true during the run-time stage. Even if the software instructions successfully compile, the resulting executables may cause exceptions.

Determining what caused an exception in order to move past the exception can be time-consuming. It can take hours or even days to determine the cause of an exception. This is costly and extends the development cycle. The examples resolve these and other issues by, at least in part, keeping track of exceptions encountered by a software developer over time, automatically recognizing that the software developer has encountered the same exception previously, and presenting contextual information regarding previous encounters with the same exception to aid the software developer in rapidly resolving the current exception. Among other advantages, the examples can greatly reduce the amount of time, and therefore cost, associated with resolving an exception.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first exception" and "second exception," and does not imply a priority, a type, an importance, or other attribute, unless otherwise stated herein. As used herein and in the claims, the articles "a" and "an" in reference to an element refers to "one or more" of the element unless otherwise explicitly specified.

Figure 1:
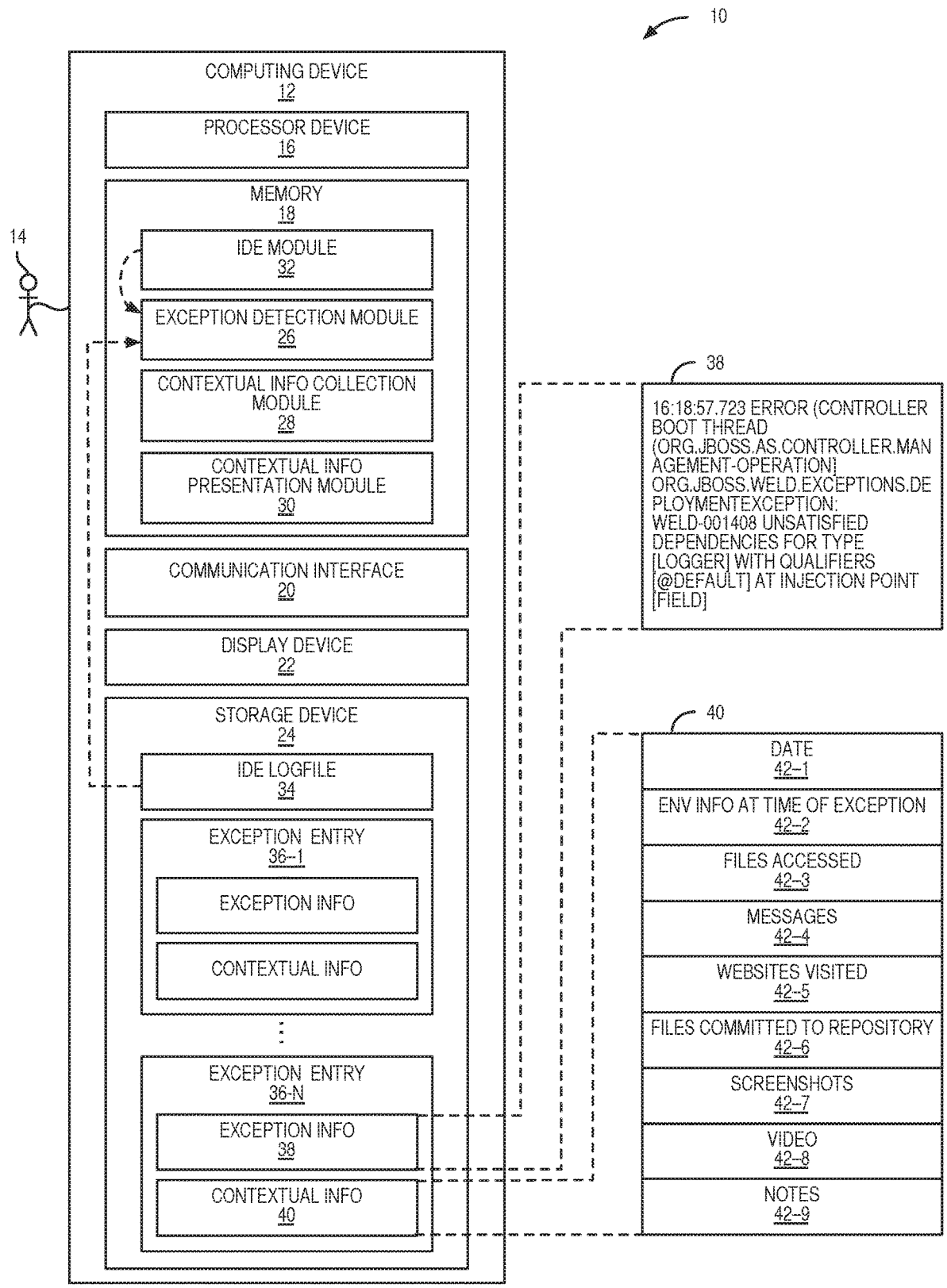
FIG. 1 is a block diagram of an environment in which examples may be practiced.

FIG. 1 is a block diagram of an environment 10 in which examples may be practiced. The environment 10 includes a computing device 12 that is operated by a corresponding software developer, referred to herein as a user 14. The computing device 12 includes a processor device 16, a memory 18, a communication interface 20, a display device 22, and a storage device 24. In some examples, the processor device 16 may implement all or portions of the functionality discussed herein via programming instructions. For example, the memory 18 may contain one or more program modules, such as an exception detection module 26, a contextual information collection module 28, and a contextual information presentation module 30, that are executed by the processor device 16 to implement all, or portions, of the functionality described herein.

While for purposes of illustration three modules are illustrated, it will be appreciated that functionality described herein may be implemented by any number of different modules depending on a desired system architecture. Because the exception detection module 26, the contextual information collection module 28, and the contextual information presentation module 30 are components of the computing device 12, functionality implemented by such modules may generally herein be attributed to the computing device 12. Moreover, in examples where such modules comprise software instructions that program the processor device 16 to carry out functionality discussed herein, functionality implemented by such modules may generally herein be attributed to the processor device 16. In other examples, functionality provided by such modules may be implemented in hardware, such as a special purpose processor, an application specific integrated circuit (ASIC), or the like.

The communication interface 20 facilitates communications with a network (not illustrated). The display device 22, via a user interface, facilitates the presentation of information to the user 14 and the entry of information from the user 14. As will be discussed in greater detail herein, the storage device 24 stores persistent data.

The user 14 interacts with a development module, such as an integrated development environment (IDE) module 32, during a software development session. The IDE module 32 facilitates the development of software by the user 14. The IDE module 32 may comprise any suitable IDE, such as, by way of non-limiting example, Red Hat Developer Studio®, Microsoft® Visual Studio®, Oracle® Jdeveloper, IBM® Rational® Application Developer, or the like. As the user 14 interacts with the IDE module 32, the IDE module 32 may generate an exception. The phrase "exception" herein refers to an event generated during the software development session by the IDE module 32, or by another component of the computing device 12, such as an operating system, that indicates a deviation from normal processing. An exception may be generated at a number of different stages during the software development process, including, for example, during a compilation stage and/or during an execution stage. An exception may comprise, by way of non-limiting example, a syntax error, a syntax warning, a run-time error, a network communication error, a data corruption error, an error indicating incorrect usage of a third-party library, or the like.

The exception detection module 26 monitors aspects of the computing device 12, such as, by way of non-limiting example, the software development session of the user 14, the operating system, other executing modules, a browser console, application runtimes, and the like. The exception detection module 26 may monitor the software development session in one or more ways. The exception detection module 26 may interact directly with the IDE module 32 and/or other modules executing on the computing device 12 via an inter-process communication mechanism such as, by way of non-limiting example, an application programming interface or a socket. Alternatively, in some examples, the exception detection module 26 may be integrated into the IDE module 32 and be a component of the IDE module 32. In other examples, the exception detection module 26 may be a plug-in that is invoked by the IDE module 32 at runtime. When the IDE module 32 generates an exception, the IDE module 32 may notify the exception detection module 26 of the exception. In addition, or alternatively, the exception detection module 26 may iteratively, during the first software development session, access data stored in an IDE logfile 34 that is generated by the IDE module 32 during the software development session. The IDE module 32 may log exceptions to the IDE logfile 34.

After the exception detection module 26 detects an exception, the contextual information collection module 28 may generate an exception entry 36-N that includes exception information 38 and contextual information 40. The exception information 38 includes information that describes the exception that may be suitable for use in determining whether the same exception is subsequently encountered by the user 14. The exception information 38 may comprise, for example, any textual information generated by the component, such as the IDE module 32 or the operating system, that generated the exception. The contextual information 40 may comprise any information that is collectable by the contextual information collection module 28 and that may subsequently be useful in aiding the user 14 to resolve the exception, should the exception occur again at a future point in time. The contextual information 40 may be useful for such purposes because typically, after the user 14 receives the exception, the user 14 will undertake actions in an attempt to resolve the exception. Many of such actions may be unsuccessful and time-consuming before the correct action is ultimately identified that resolves the exception. Prior to the examples herein, the actions that the user 14 takes to resolve the exception may not have been otherwise recorded by the user 14 and, should the user 14 encounter the same exception at a future date, such as three months later, the user 14 may have little or no recall about how the exception was ultimately resolved. Accordingly, the user 14 may expend unproductive time repeating the same actions previously taken. Moreover, the user 14 may identify a different solution to resolving the exception than the solution used to resolve the exception when previously encountered, resulting in varying and inconsistent coding practices.

In contrast, upon detection of the exception, the examples obtain contextual information 40 from the computing device 12 that may subsequently be useful in aiding the user 14 in resolving a future occurrence of the same exception. Such contextual information 40 may comprise, by way of non-limiting example, a date and time of an occurrence of the exception. Such contextual information 40 may be stored in a date field 42-1. The contextual information 40 may comprise environmental information that identifies a current operating environment of the computing device 12 at a time substantially contemporaneous with the occurrence of the exception. Substantially contemporaneous refers to a period of time in relatively close proximity to the occurrence of the exception, such as within 15 seconds of the occurrence of the exception. The environmental information may comprise information that identifies static and dynamic aspects of the computing device, such as a total size of the memory 18, an available amount of the memory 18, a size of the storage device 24, a number of running processes in the memory 18, names of the processes executing in the memory 18, a processor utilization of the processor device 16, and/or a history of recently terminated processes of the computing device 12. Such contextual information 40 may be stored in an environmental information field 42-2.

The contextual information 40 may also include information regarding actions and/or events that occur for a period of time after the occurrence of the exception. The period of time may be predetermined, and may be configurable by the user 14. The predetermined period of time may be any suitable timeframe, such as five minutes, fifteen minutes, thirty minutes, or any other desired timeframe. Thus, the contextual information collection module 28 may monitor activities of the computing device 12 for the predetermined period of time and record actions and/or events to the contextual information 40. By way of non-limiting example, the contextual information 40 may include a plurality of titles of corresponding files stored on the computing device 12 that were opened and/or modified during the predetermined period. Such contextual information 40 may be stored in a files accessed field 42-3. The contextual information 40 may include identities of individuals contacted by the user 14 via the computing device 12 during the period of time, such as via a real-time communications application, such as a chat or messaging application, or via an email client. The contextual information 40 may also include the text of and replies to such communications. Such contextual information 40 may be stored in a messaging field 42-4. The contextual information 40 may include a plurality of uniform resource locators (URLs) that identify a corresponding plurality of websites visited by the user 14 during the predetermined period of time. Such contextual information 40 may be stored in a websites visited field 42-5. The contextual information 40 may include a plurality of titles of corresponding files committed to a file repository during the predetermined period of time. Such contextual information 40 may be stored in a repository field 42-6.

The contextual information 40 may also include a plurality of screenshots taken of the display device 22 at a periodic interval over the predetermined period of time. For example, the contextual information collection module 28 may capture an image of the current contents of the display device 22 every one, two, five, or ten seconds during the predetermined period of time. Such contextual information 40 may be stored in a screenshots field 42-7. Alternatively or in addition, the contextual information 40 may include a video depicting content presented on the display device 22 during the predetermined period of time. Such contextual information 40 may be stored in a video field 42-8. In some examples, the contextual information collection module 28 may present, on the display device 22, a user interface control that allows the user 14 to enter comments, or notes, regarding the exception. Such contextual information 40 may be stored in a notes field 42-9. The contextual information may also include, by way of non-limiting example, any shell or console command history/logfiles that identify commands that may have been entered by the user 14 prior to the exception.

The contextual information collection module 28 stores the exception entry 36-N in the storage device 24. Over time, the storage device 24 may store a plurality of exception entries 36-1-36-N, each of which correspond to exceptions encountered by the user 14 during software development sessions. While certain examples of contextual information 40 have been provided, it will be apparent that the examples are not limited to such contextual information 40 and that the contextual information 40 can include any information obtainable from or via the computing device 12.

Figure 2:
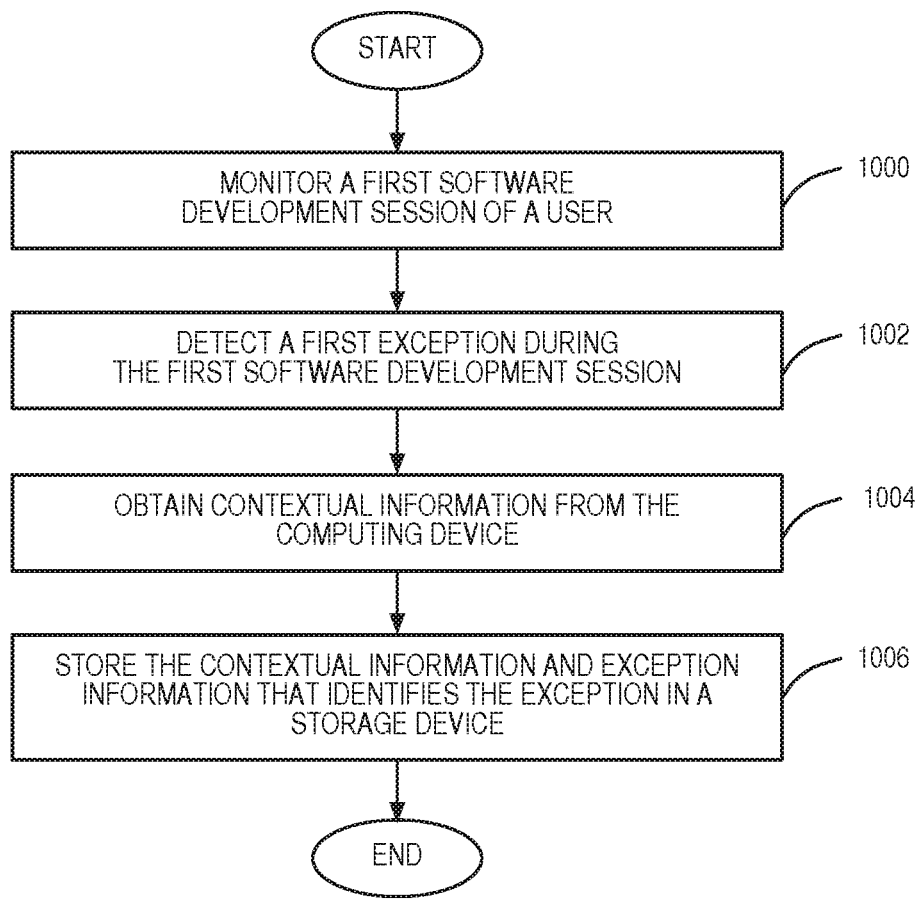
FIG. 2 is a flowchart of a method for storing the contextual information, according to one example.

FIG. 2 is a flowchart of a method for storing the contextual information 40 according to one example. FIG. 2 will be discussed in conjunction with FIG. 1. The computing device 12 monitors a software development session of the user 14 (block 1000). An exception is detected during the first software development session (block 1002). In response to detecting the exception, contextual information is obtained from the computing device 12 (block 1004). The contextual information and exception information that identifies the exception is stored in the storage device 24 (block 1006).

Figure 3A:
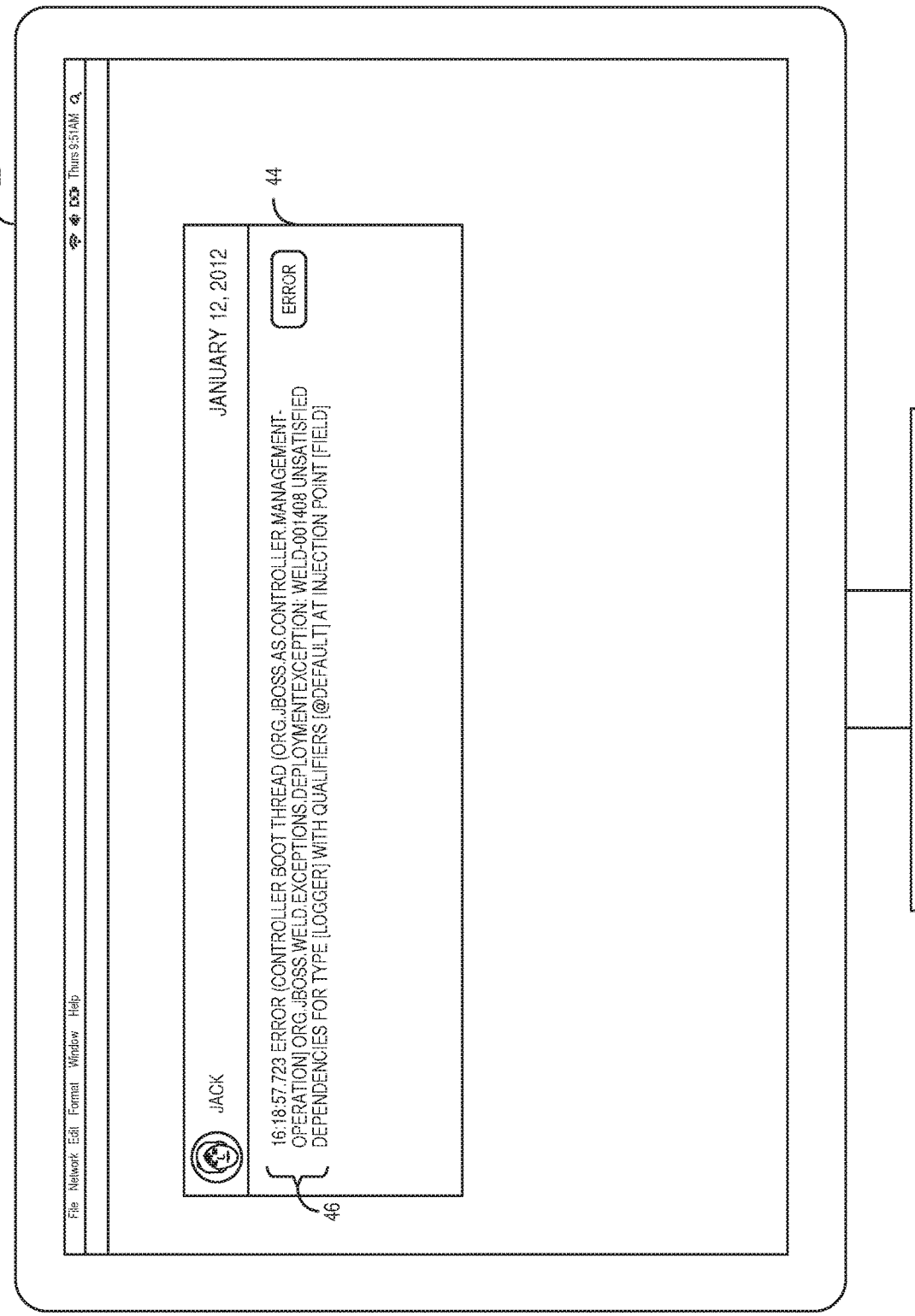
FIGS. 3A-3B illustrate user interfaces that may be presented on the display device 22, according to one example.
Figure 3B:
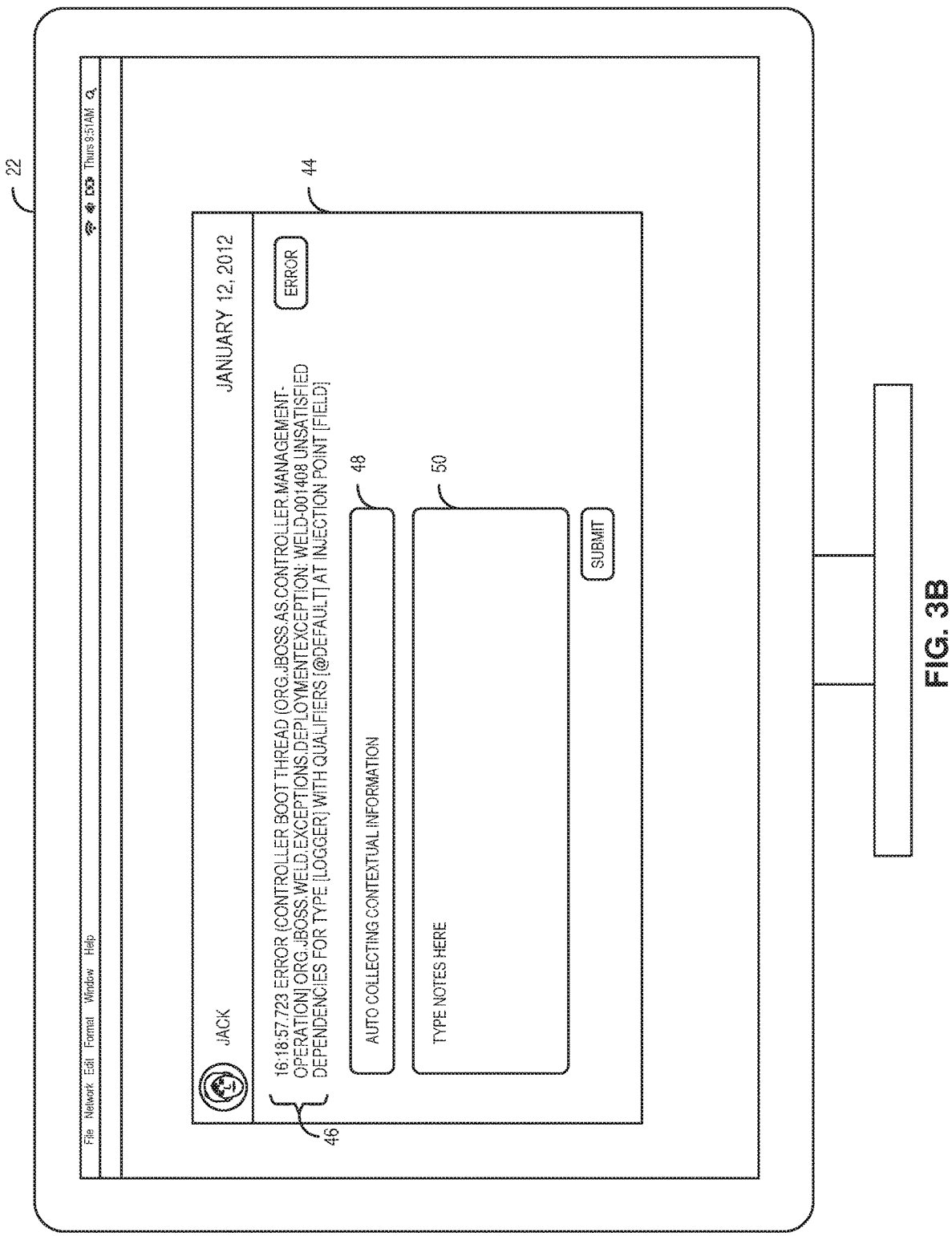

FIGS. 3A-3B illustrate user interfaces that may be presented on the display device 22 according to one example. FIG. 3A illustrates a user interface 44 that may be presented upon the detection of an exception. Exception text 46 may be generated by the component, such as the IDE module 32, that generated the exception. The exception text 46 may form part of the exception information 38 collected and stored by the contextual information collection module 28.

FIG. 3B illustrates the user interface 44 at a subsequent point in time. In one example, the contextual information collection module 28 may present a message 48 that notifies the user 14 that contextual information may be automatically collected. The contextual information collection module 28 may also provide a notes dialog box 50 that allows the user 14 to enter information about the exception that may be recorded by the contextual information collection module 28 in the notes field 42-9.

Referring again to FIG. 1, at a subsequent point in time, such as, by way of non-limiting example, several months later, the user 14 may encounter the same exception during a subsequent software development session. The exception detection module 26 detects the exception. In one example, the exception detection module 26 may first access the exception entries 36-1-36-N in the storage device 24 to determine if the exception has been encountered by the user 14 previously. In particular, the exception detection module 26 may utilize textual information associated with the exception, such as an exception identification number, and/or exception explanation text, and compare such information to the exception information 38 stored in the exception entries 36. If the exception detection module 26 determines that the exception has been previously encountered, the contextual information presentation module 30 may automatically, without user input, present on the display device 22 the contextual information 40 previously collected and stored when the exception was previously encountered by the user 14.

Figure 4:
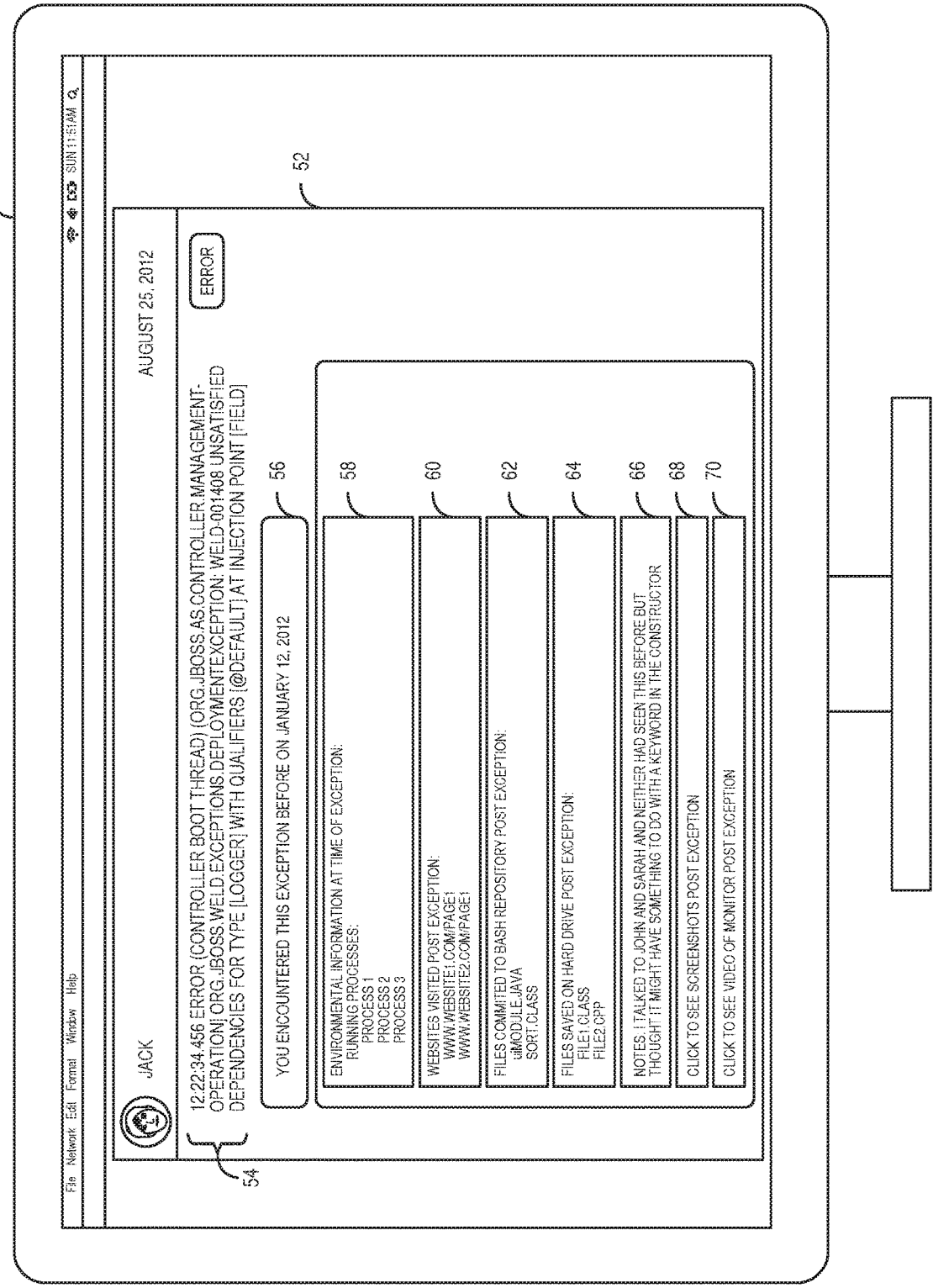
FIG. 4 illustrates a user interface that presents to a user an encountered exception and contextual information that was obtained when the same exception was previously encountered, according to one example.

FIG. 4 illustrates a user interface 52 that presents to the user 14 an encountered exception and contextual information that was obtained from the computing device 12 when the same exception was previously encountered, according to one example. Assume for purposes of illustration that the exception detection module 26 determines that the currently encountered exception matches the exception identified in the exception information 38 of the exception entry 36-1. The contextual information presentation module 30 accesses the exception entry 36-1, and based on the contextual information 40, generates and presents information in the user interface 52. In particular, the user interface 52 may include exception text 54 that is generated by the component, such as the IDE module 32, that generated the exception. The user interface 52 may also present a message 56 that informs the user 14 that the user 14 previously encountered the same exception. Based on the date field 42-1, the message 56 may also identify the date and time the exception was encountered. The user interface 52 may, based on the environmental information field 42-2, present environmental information 58 about the computing device 12 at the time of the previous encounter of the exception. The user interface 52 may, based on the websites visited field 42-5, present website information 60 that identifies the URLs of corresponding websites visited by the user 14 during a predetermined period of time after the previous occurrence of the exception. The user interface 52 may, based on the repository field 42-6, present repository information 62 that identifies the titles of corresponding files committed to a file repository during the predetermined period of time.

The user interface 52 may, based on the files accessed field 42-3, present file information 64 that identifies titles of corresponding files stored on the computing device 12 that were opened and/or modified during the predetermined period of time.

The user interface 52 may, based on the notes field 42-9, present notes information 66 that contains notes generated by the user 14 about the exception. The user interface 52 may, based on the screenshots field 42-7, present a screenshot control 68 that allows the user 14 to view images of the contents of the display device 22 taken iteratively over the predetermined period of time. The user interface 52 may, based on the video field 42-8, present a video control 70 that allows the user 14 to view video depicting content presented on the display device 22 over the predetermined period of time. While for purposes of illustration only certain contextual information has been discussed as being presented to the user 14, it will be apparent that any contextual information may be presented to the user 14, such as any shell or console command history/logfiles that identify commands that may have been entered by the user 14 prior to the exception.

Figure 5:
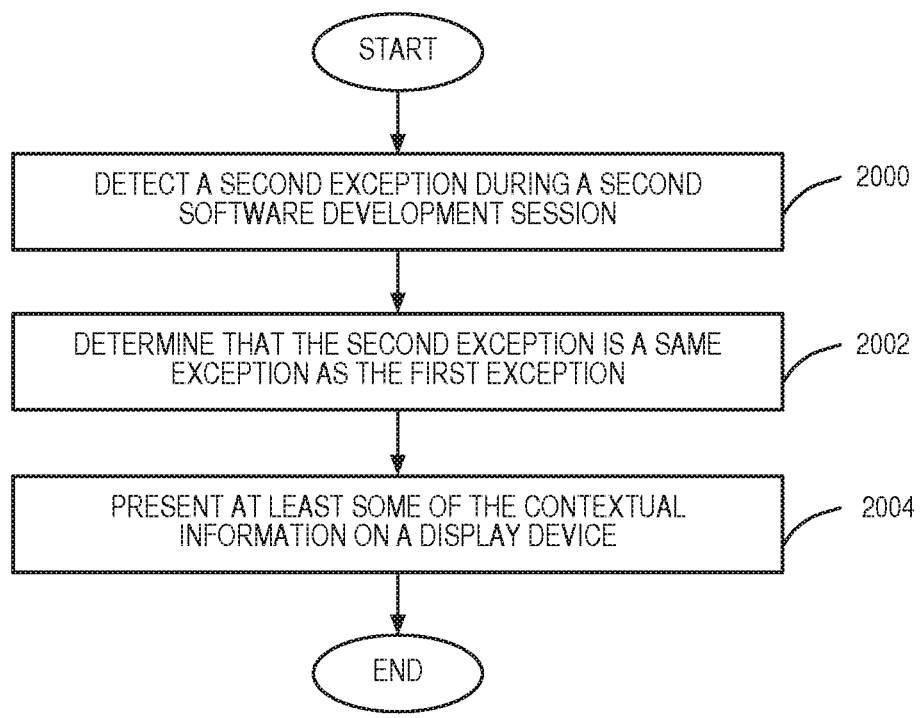
FIG. 5 is a flowchart of a method for presenting contextual information collected at a time when a currently encountered exception was previously encountered, according to one example.

FIG. 5 is a flowchart of a method for presenting contextual information collected at a time when a currently encountered exception was previously encountered, according to one example. The computing device 12 detects the exception during the subsequent development session (block 2000). It is determined that the current exception is the same exception as a previously encountered exception (block 2002). The contextual information 40 obtained when the exception was previously encountered is presented on the display device 22 (block 2004).

Figure 6:
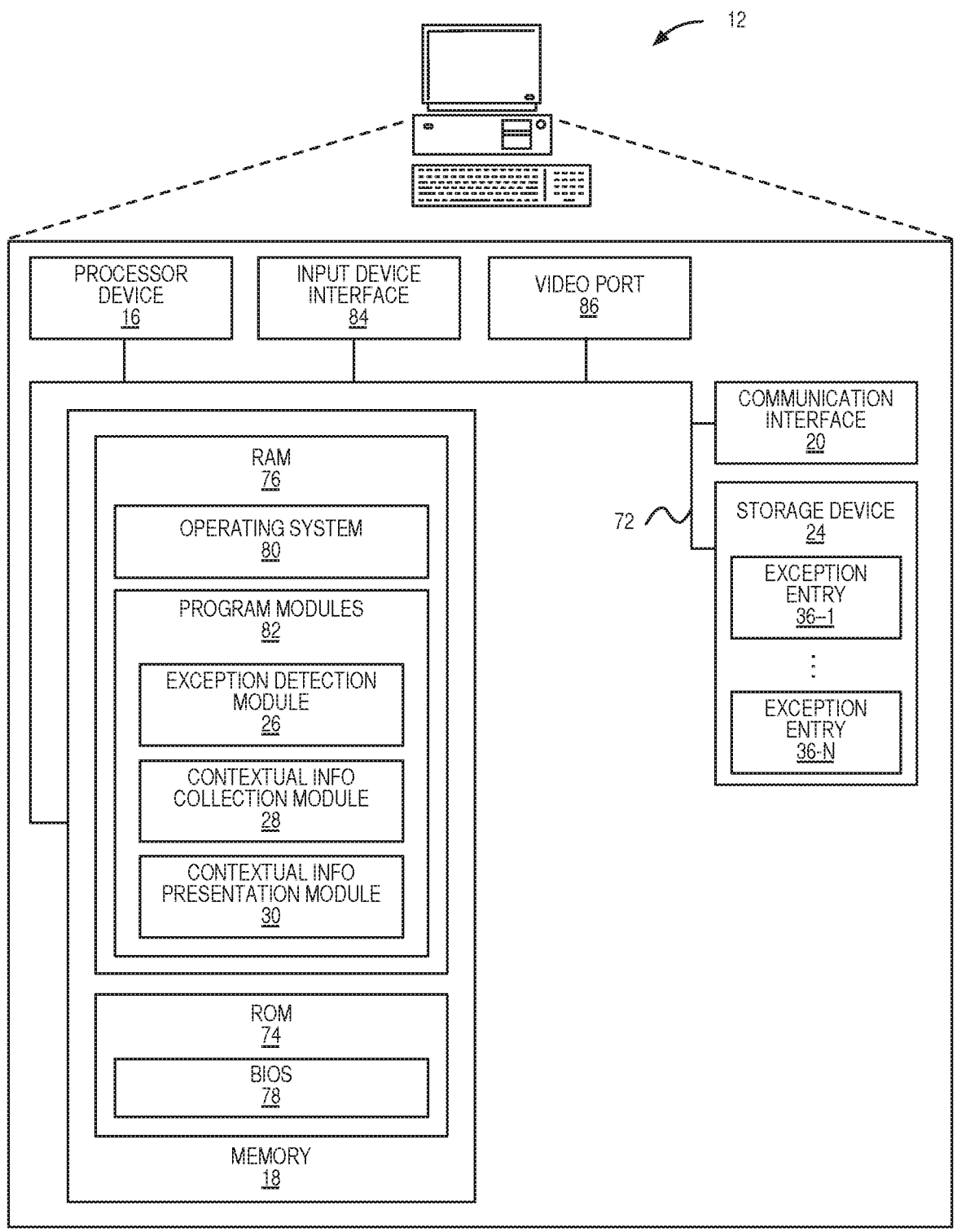
FIG. 6 is a block diagram of a computing device suitable for implementing examples, according to one example.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, a smartphone computing tablet, or the like. The computing device 12 includes the processor device 16, the system memory 18, and a system bus 72. The system bus 72 provides an interface for system components including, but not limited to, the system memory 18 and the processor device 16. The processor device 16 can be any commercially available or proprietary processor.

The system bus 72 may be any of several types of bus structures that may further interconnect to a memory bus (with or without a memory controller), a peripheral bus, and/or a local bus using any of a variety of commercially available bus architectures. The system memory 18 may include non-volatile memory 74 (e.g., read-only memory (ROM), erasable programmable read-only memory (EPROM), electrically erasable programmable read-only memory (EEPROM), etc.), and volatile memory 76 (e.g., random-access memory (RAM)). A basic input/output system (BIOS) 78 may be stored in the non-volatile memory 74 and can include the basic routines that help to transfer information between elements within the computing device 12. The volatile memory 76 may also include a high-speed RAM, such as static RAM, for caching data.

The computing device 12 may further include or be coupled to a non-transitory computer-readable storage medium such as the storage device 24, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 24 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and further, that any such media may contain computer-executable instructions for performing novel methods of the disclosed examples.

A number of modules can be stored in the storage device 24 and in the volatile memory 76, including an operating system 80 and one or more program modules 82, such as the exception detection module 26, the contextual information collection module 28, and the contextual information presentation module 30, which may implement the functionality described herein in whole or in part. It is to be appreciated that the examples can be implemented with various commercially available operating systems 80 or combinations of operating systems 80.

A number of modules can be stored in the storage device 24 and in the volatile memory 76, including, by way of non-limiting example, the exception detection module 26, the contextual information collection module 28, and the contextual information presentation module 30. All or a portion of the examples may be implemented as a computer program product stored on a transitory or non-transitory computer-usable or computer-readable storage medium, such as the storage device 24, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the exception detection module 26, the contextual information collection module 28, and the contextual information presentation module 30 in the volatile memory 76, may serve as a controller, or control system, for the computing device 12 that is to implement the functionality described herein.

An operator, such as the user 14, may also be able to enter one or more commands through a keyboard (not illustrated), a pointing device such as a mouse (not illustrated), or a touch-sensitive surface such as the display device 22. Such input devices may be connected to the processor device 16 through an input device interface 84 that is coupled to the system bus 72 but can be connected by other interfaces such as a parallel port, an Institute of Electrical and Electronic Engineers (IEEE) 1394 serial port, a Universal Serial Bus (USB) port, an IR interface, and the like.

The computing device 12 may also include the communication interface 20 suitable for communicating with a network (not illustrated) as appropriate or desired. The computing device 12 may also include a video port 86 configured to interface with the display device 22, to provide information to the user 14.

Figure 7:
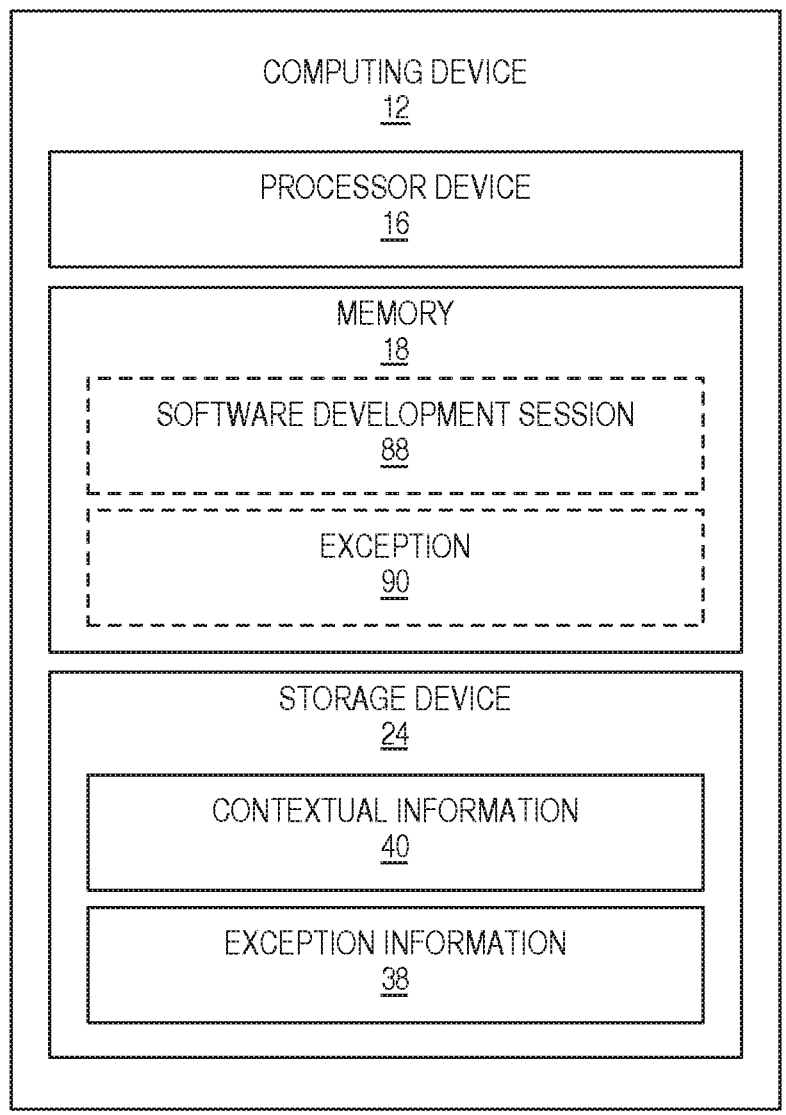
FIG. 7 is a block diagram of a computing device suitable for implementing examples, according to another example.

FIG. 7 is a block diagram of the computing device 12 suitable for implementing examples, according to another example. The computing device 12 includes the processor device 16 and the memory 18. The computing device 12 monitors a software development session 88 of the user 14 (not illustrated). An exception 90 is detected during the software development session 88. In response to detecting the exception, contextual information 40 is obtained from the computing device 12. The contextual information 40 and exception information 38 that identifies the exception 90 is stored in the storage device 24.

Individuals will recognize improvements and modifications to the preferred examples of the disclosure. All such improvements and modifications are considered within the scope of the concepts disclosed herein and the claims that follow.

What is claimed is:

1. A method comprising:
monitoring, by a computing device comprising a processor device, a first software development session of a user, the first software development session being implemented by a development environment configured to facilitate a generation of software instructions;
detecting a first exception during the first software development session;
in response to detecting the first exception, obtaining first contextual information from the computing device;
storing the first contextual information and first exception information that identifies the first exception in a storage device;
detecting a second exception during a second software development session;
determining that the second exception is a same exception as the first exception; and
in response to determining that the second exception is the same exception as the first exception:
accessing the first contextual information from the storage device; and
presenting at least some of the first contextual information on a display device.

2. The method of claim 1 further comprising:
obtaining second contextual information from the computing device; and
storing the second contextual information and second exception information that identifies the second exception in the storage device.

3. The method of claim 1 wherein determining that the second exception is the same exception as the first exception comprises:
obtaining second exception information that identifies the second exception;
accessing first exception information from the storage device; and
comparing the second exception information to the first exception information to determine that the second exception is the same exception as the first exception.

4. The method of claim 1 wherein accessing the first contextual information from the storage device and presenting at least some of the first contextual information on the display device further comprises automatically, without user input, accessing the first contextual information from the storage device and automatically, without user input, presenting at least some of the first contextual information on the display device.

5. The method of claim 1 wherein monitoring the first software development session of a user comprises iteratively, during the first software development session, accessing data stored in a logfile generated by a development module that executes during the first development session.

6. The method of claim 1 further comprising obtaining the first exception information from a logfile generated by a development module that executes during the first development session.

7. The method of claim 1 wherein the first contextual information comprises one or more of:
a date and time of an occurrence of the first exception;
environmental information that identifies a current operating environment of the computing device at a time substantially contemporaneous with the occurrence of the first exception;
a plurality of titles of corresponding files stored on the computing device that were opened and/or modified during a predetermined period of time after the occurrence of the first exception;
a plurality of uniform resource locators (URLs) that identify a corresponding plurality of websites visited during the predetermined period of time;
a plurality of email identifiers that identify a corresponding plurality of emails opened during the predetermined period of time;
a plurality of titles of corresponding files committed to a file repository during the predetermined period of time; or
a plurality of commands entered by the user within a period of time prior to the occurrence of the exception.

8. The method of claim 7 wherein the environmental information comprises one or more of a total size of the memory, an available amount of the memory, a size of the storage device, a number of running processes in the memory, names of the processes, or a processor utilization of the processor device.

9. The method of claim 1 wherein the first contextual information comprises one or more of:
a plurality of screenshots of the display device taken over a predetermined period of time after a time of occurrence of the first exception; and
a video depicting content presented on the display device over the predetermined period of time.

10. The method of claim 1 wherein obtaining the first contextual information further comprises receiving a user note regarding the first exception, and wherein the first contextual information comprises the user note.

11. The method of claim 1 wherein detecting the first exception during the first software development session comprises:
accessing a logfile generated by a development module that executes during the first software development session; and
determining that an entry in the logfile identifies the first exception.

12. A computing device comprising:
a memory; and
a processor device coupled to the memory to:

monitor a first software development session of a user, the first software development session being implemented by a development environment configured to facilitate a generation of software instructions;

detect a first exception during the first software development session;

in response to detecting the first exception, obtain first contextual information from the computing device;

store the first contextual information and first exception information that identifies the first exception in a storage device;

detect a second exception during a second software development session;

determine that the second exception is a same exception as the first exception; and in response to determining that the second exception is the same exception as the first exception:

access the first contextual information from the storage device; and present at least some of the first contextual information on a display device.

13. The computing device of claim 12 wherein to access the first contextual information from the storage device and present at least some of the first contextual information on the display device the processor is further to automatically, without user input, access the first contextual information from the storage device and automatically, without user input, present at least some of the first contextual information on the display device.

14. The computing device of claim 12 wherein the first contextual information comprises one or more of:

a date and time of an occurrence of the first exception;

environmental information that identifies a current operating environment of the computing device at a time substantially contemporaneous with the occurrence of the first exception;

a plurality of titles of corresponding files stored on the computing device that were opened and/or modified during a predetermined period of time after the occurrence of the first exception;

a plurality of uniform resource locators (URLs) that identify a corresponding plurality of websites visited during the predetermined period of time;

a plurality of email identifiers that identify a corresponding plurality of emails opened during the predetermined period of time; or a plurality of titles of corresponding files committed to a file repository during the predetermined period of time.

15. The computing device of claim 12 wherein the first contextual information comprises one or more of:

a plurality of screenshots of the display device taken over a predetermined period of time after a time of occurrence of the first exception; and a video depicting content presented on the display device over the predetermined period of time.

16. A computer program product stored on a non-transitory computer-readable storage medium and including instructions to cause a processor device to:

monitor a first software development session of a user, the first software development session being implemented by a development environment configured to facilitate a generation of software instructions;

detect a first exception during the first software development session;

in response to detecting the first exception, obtain first contextual information from a computing device;

store the first contextual information and first exception information that identifies the first exception in a storage device;

detect a second exception during a second software development session;

determine that the second exception is a same exception as the first exception; and in response to determining that the second exception is the same exception as the first exception:

access the first contextual information from the storage device; and present at least some of the first contextual information on a display device.

17. The computer program product of claim 16 wherein to access the first contextual information from the storage device and present at least some of the first contextual information on the display device, the instructions further cause the processor to automatically, without user input, access the first contextual information from the storage device and automatically, without user input, present at least some of the first contextual information on the display device.

* * * * *